(12) United States Patent
Henriksson et al.

(10) Patent No.: US 11,473,468 B2
(45) Date of Patent: Oct. 18, 2022

(54) AFTERTREATMENT SYSTEM

(71) Applicant: VOLVO TRUCK CORPORATION, Gothenburg (SE)

(72) Inventors: Björn Henriksson, Gothenburg (SE); Sebastian Pelto-Piri, Olofstorp (SE); Mikael Forsberg, Gothenburg (SE)

(73) Assignee: VOLVO TRUCK CORPORATION, Gothenburg (SE)

( * ) Notice: Subject to any disclaimer, the term of this patent is extended or adjusted under 35 U.S.C. 154(b) by 0 days.

(21) Appl. No.: 17/296,454

(22) PCT Filed: Nov. 30, 2018

(86) PCT No.: PCT/EP2018/083158
§ 371 (c)(1),
(2) Date: May 24, 2021

(87) PCT Pub. No.: WO2020/108774
PCT Pub. Date: Jun. 4, 2020

(65) Prior Publication Data
US 2022/0042438 A1    Feb. 10, 2022

(51) Int. Cl.
*F01N 13/00* (2010.01)
*F01N 3/20* (2006.01)
*F01N 9/00* (2006.01)

(52) U.S. Cl.
CPC ......... *F01N 3/2053* (2013.01); *F01N 3/2066* (2013.01); *F01N 13/0093* (2014.06); *F01N 13/0097* (2014.06); *F01N 13/017* (2014.06); *F01N 9/00* (2013.01); *F01N 2240/36* (2013.01); *F01N 2410/10* (2013.01); *F01N 2470/02* (2013.01); *F01N 2470/24* (2013.01);
(Continued)

(58) Field of Classification Search
CPC ............... F01N 3/2053; F01N 13/0093; F01N 2410/10; F01N 2470/24; F01N 2900/1411
See application file for complete search history.

(56) References Cited

U.S. PATENT DOCUMENTS 6,192,675 B1 *  2/2001  Hirota ................. F01N 13/0097
                                                                60/288
2005/0000208 A1   1/2005  Liu
(Continued)

FOREIGN PATENT DOCUMENTS

DE   102005035555 A1    2/2007
DE   102008036046 A1 *  2/2010  ........... F01N 13/145
(Continued)

OTHER PUBLICATIONS

Machine translation of DE-102008036046-A1, accessed Mar. 8, 2022. (Year: 2022).*
(Continued)

*Primary Examiner* — Jonathan R Matthias
(74) *Attorney, Agent, or Firm* — Venable LLP; Jeffri A. Kaminski

(57) ABSTRACT

An aftertreatment system (100) connected downstream an internal combustion engine arrangement (102) for receiving exhaust gases conveyed from the internal combustion engine arrangement (102) during operation thereof, wherein the aftertreatment system comprises first and second catalytic devices in series, wherein a gap is there between.

10 Claims, 5 Drawing Sheets

(52) U.S. Cl.
  CPC ...... *F01N 2570/14* (2013.01); *F01N 2590/08* (2013.01); *F01N 2900/1411* (2013.01)

(56) References Cited

U.S. PATENT DOCUMENTS

| | | | |
|---|---|---|---|
| 2009/0120076 A1 | 5/2009 | Bailey et al. | |
| 2009/0250018 A1* | 10/2009 | Sano | F01N 13/009 123/3 |
| 2009/0266063 A1 | 10/2009 | Gandhi et al. | |
| 2015/0337702 A1* | 11/2015 | Ettireddy | B01D 53/9477 60/297 |
| 2017/0122175 A1 | 5/2017 | Kumar et al. | |

FOREIGN PATENT DOCUMENTS

| | | | | |
|---|---|---|---|---|
| DE | 202016103189 U1 | 6/2016 | | |
| DE | 102015213112 A1 | 1/2017 | | |
| EP | 0174742 A1 | 3/1986 | | |
| EP | 0916389 A1 | 5/1999 | | |
| EP | 2813678 A1 | 12/2014 | | |
| GB | 2471001 A * | 12/2010 | .......... | F01N 13/017 |
| WO | 2013153257 A1 | 10/2013 | | |
| WO | WO-2019201546 A1 * | 10/2019 | ............ | F01N 1/163 |

OTHER PUBLICATIONS

Machine translation of DE-102015213112-A1, accessed Mar. 8, 2022. (Year: 2022).*
Machine translation of WO-2019201546-A1, accessed Mar. 8, 2022. (Year: 2022).*
International Search Report and Written Opinion dated May 8, 2019 in corresponding International PCT Application No. PCT/EP2018/083158, 9 pages.
Chinese Office Action dated May 18, 2022 in corresponding Chinese Patent Application No. 201880099746.9, 9 pages.

* cited by examiner

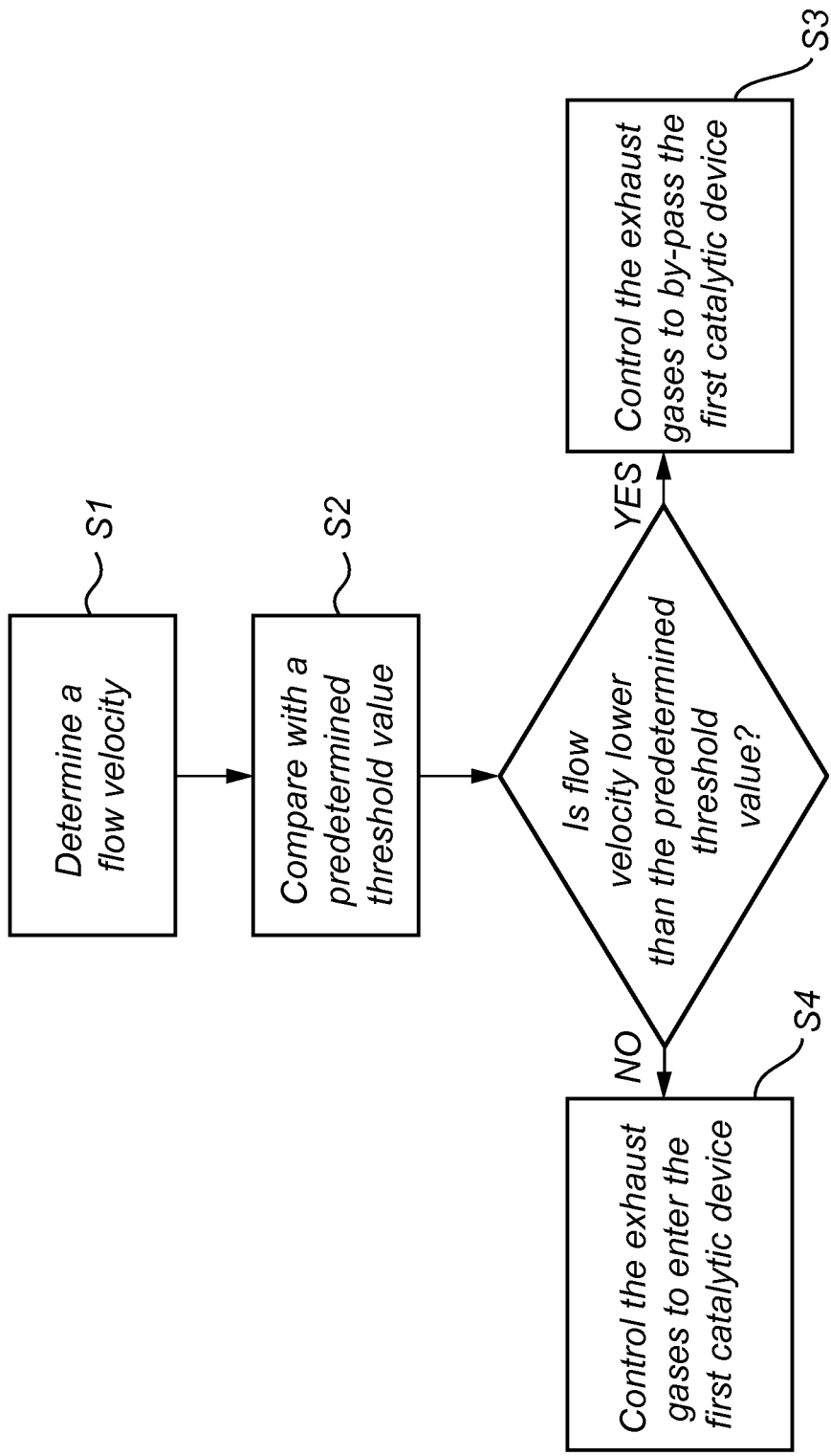

AFTERTREATMENT SYSTEM

CROSS-REFERENCE TO RELATED APPLICATIONS

This application is a U.S. National Stage application of PCT/EP2018/083158, filed Nov. 30, 2018, and published on Jun. 4, 2020, as WO 2020/108774 A1, all of which is hereby incorporated by reference in its entirety.

TECHNICAL FIELD

The present disclosure relates to an aftertreatment system. The disclosure also relates to a method for controlling a corresponding aftertreatment system. The aftertreatment system and method is applicable on vehicles, in particularly low, medium and heavy duty vehicles commonly referred to as trucks. Although the disclosure will mainly be described in relation to a truck, it may also be applicable for other type of vehicles.

BACKGROUND

For many years, the demands on internal combustion engines have been steadily increasing and engines are continuously developed to meet the various demands from the market. Furthermore, in the field of trucks, there are applicable law directives that have e.g. determined the maximum amount of certain exhaust gas emissions allowable.

In order to reduce harmful emission gas, and in particular nitrogen oxides (NOx), the engine exhaust aftertreatment system (EATS) of the vehicles have been equipped with systems to convert NOx by reduction to gaseous Nitrogen. The EATS operates at its best after reaching a predetermined temperature threshold. Hence, the EATS should preferably be relatively warm, that is, above the temperature threshold, to function as desired. During, for example, frequent idling operation of the internal combustion engine, or low load operation, the exhaust gas may not reach the threshold temperature and the EATS will cool down. If the EATS is cooled down too much, it may no longer reduce NOx as desired. Also, long period of idling, when no urea is added to exhaust gas upstream the EATS, may cause a urea buffer in the EATS to go empty, which also has a negative effect on the NOx reduction.

There is thus a desire to further develop the EATS such as to be able to reduce NOx more consistently throughout the operating range of the internal combustion engine.

SUMMARY

The present disclosure describes an aftertreatment system which is arranged to reduce NOx gases, especially during specific drive patterns of the vehicle, i.e. during different modes of operation at which it is normally difficult to reduce such NOx gases. This is at least partly achieved by an aftertreatment system according to claim 1.

According to a first aspect, there is provided an aftertreatment system connectable downstream of an internal combustion engine arrangement for receiving exhaust gases conveyed from the internal combustion engine arrangement during operation thereof, the aftertreatment system comprising a catalytic reduction arrangement comprising a first catalytic device and a second catalytic device, wherein the first and second catalytic devices are arranged in series with each other in the flow direction of the exhaust gas, wherein a geometric gap is present between an outlet of the first catalytic device and an inlet of the second catalytic device, wherein the aftertreatment system further comprises a casing housing the catalytic reduction arrangement, the casing extending between a portion of the first catalytic device and a portion of the second catalytic device; and a by-pass duct arranged outside the casing for allowing exhaust gases to by-pass the first catalytic device, wherein the casing comprises at least one through hole arranged at the position of the geometric gap for allowing exhaust gases by-passing the first catalytic device to enter the inlet of the second catalytic device.

The wording "catalytic reduction arrangement" should in the following be understood to mean an arrangement which is configured to reduce NOx gas contained in the exhaust gas conveyed from the internal combustion engine arrangement during operation thereof. The catalytic reduction arrangement thus reduces NOx gas which is converted to e.g. nitrogen gas, N2. At least the second catalytic device is arranged to reduce NOx gas. The first catalytic device is also preferably arranged to reduce NOx gas, although it may be a particle trap which is arranged to trap the NOx gas, and subsequently release and supply the NOx gas to the second catalytic device. Example embodiments of the first and second catalytic devices are described in further detail below.

Moreover, the geometric gap should be construed as a non-zero distance between the first catalytic device and the second catalytic device. Thus, the geometric gap is a gap between an outlet side of the first catalytic device and an inlet side of the second catalytic device. In even further detail, exhaust gas from the first catalytic device will thus enter the geometric gap before entering the second catalytic device.

Furthermore, the by-pass duct should be construed as a passage in which exhaust gas can by-pass the first catalytic device and be directed into the geometric gap. Thus, the by-pass duct is arranged outside the first catalytic device.

The present disclosure is based on the insight that by providing at least one through hole in the casing, exhaust gas can be arranged to selectively by-pass the first catalytic device. An advantage is that during e.g. low load operation of the internal combustion engine, exhaust gas can by-pass the first catalytic device. The temperature of the first catalytic device will thereby not be reduced by flow through of exhaust gas. Also, a buffer of reducing agent present in the first catalytic device will not be emptied during the low load operation. When subsequently operating the internal combustion engine in a normal mode of operation, the exhaust gas is arranged through both the first and second catalytic devices. Hereby, since the first catalytic device is kept relatively warm (i.e. it is not cooled by the cooler exhaust gas) and filled with reducing agent, an improvement in the reduction process of reducing NOx to N2 is achieved as reduction can be initiated relatively instantaneously.

In order to enable the exhaust gas to enter the by-pass duct, a valve may be used, as will be described below. However, an inlet to the bypass may be configured as an opening near the inlet to the first catalytic device, so by-passing the first catalytic device can be achieved by means of the difference between the pressure drop through the first catalytic device and the pressure drop in the by-pass duct. In detail, the at least one through hole enables for different decreases in pressure level through the first catalytic device compared to the by-pass duct. This difference in gas pressure levels, i.e. difference in pressure drop though the first catalytic device versus the pressure drop in the by-pass conduit, will cause exhaust gas with relatively low flow velocity, i.e. during low load operation, to enter the by-pass conduit instead of entering the first catalytic device. The at least one through hole thus provides a reduced pressure drop in the by-pass conduit compared to the pressure drop through the first catalytic device, which allows the low flow exhaust gas to bypass the first catalytic device. The flow through the at least one through hole will continue until the pressure drop in the by-pass conduit is the same as the pressure drop through the first catalytic device. The size and configuration of the at least one through hole can enable for increased/decreased pressure drop in the by-pass conduit.

According to an example embodiment, the aftertreatment system may further comprise a plurality of through holes arranged in the casing at the position of the geometric gap. The plurality of through holes can be arranged in the form of a plurality of perforations in the casing. Hereby, the pressure drop in the by-pass conduit can be controlled to a greater extent, and a substantially continuous flow of exhaust gas can be directed from the by-pass conduit and into the geometric gap.

According to an example embodiment, the casing may extend between an inlet end of the first catalytic device and an outlet end of the second catalytic device.

Hereby, the casing encloses both the first and second catalytic devices in the axial direction, i.e. in the flow direction of the exhaust gas.

According to an example embodiment, the first catalytic device may be a first selective catalytic reduction device arranged to convert nitrogen oxides (NOx) into diatomic nitrogen (N2).

According to an example embodiment, the second catalytic device may be a second selective catalytic reduction device arranged to convert nitrogen oxides (NOx) into diatomic nitrogen (N2).

A selective catalytic reduction device (SCR) should be understood to mean a device which is arranged to convert nitrogen oxides (NOx) with the aid of a catalyst into at least diatomic nitrogen (N2). Preferably, a reducing agent, such as e.g. urea, is added to the exhaust gas before the exhaust gas enters the catalytic reduction arrangement.

Providing two SCR's in series with each other according to the above described configuration is advantageous as it enables for continuous reduction of NOx, as well as for maintaining the first SCR warm and filled with reducing agent during low load operation.

According to an example embodiment, the aftertreatment system may further comprise a valve arrangement positioned in fluid communication between the internal combustion engine arrangement and the catalytic reduction arrangement, the valve being arranged to controllably direct exhaust gases from the internal combustion engine arrangement to the inlet of the first catalytic device or to the by-pass duct.

The flow of exhaust gas can be controlled by means of the valve arrangement. As will be described below, the valve arrangement may be either mechanically controlled or connected to a control unit for control thereof.

According to an example embodiment, the valve arrangement may comprise an electronically controlled valve, wherein the aftertreatment system further comprises a control unit electrically connected to the electronically controlled valve for controlling operation thereof.

The control unit may include a microprocessor, microcontroller, programmable digital signal processor or another programmable device. The control unit may also, or instead, include an application specific integrated circuit, a programmable gate array or programmable array logic, a programmable logic device, or a digital signal processor. Where the control unit includes a programmable device such as the microprocessor, microcontroller or programmable digital signal processor mentioned above, the processor may further include computer executable code that controls operation of the programmable device.

According to an example embodiment, the control unit may be configured to receive a signal indicative of a flow velocity of the exhaust gases conveyed from the internal combustion engine arrangement; compare the flow velocity with a predetermined threshold value; and control the electronically controlled valve to direct the exhaust gas to the by-pass duct if the flow velocity is lower than the predetermined threshold.

According to an example embodiment, the valve arrangement may comprise a mechanically controlled valve. The mechanically controlled valve may preferably comprise a spring which is controlled based on the flow velocity of the combustion gases.

Using a mechanically controlled valve is advantageous since it can "automatically" direct the exhaust gas into the by-pass conduit when the flow velocity is below a preset limit.

According to an example embodiment, the aftertreatment system may further comprise a housing containing the catalytic reduction arrangement, the by-pass duct being formed by a space between the housing and the casing. Hereby, an inner wall of the housing and an outer wall of the casing can form the space generating the by-pass duct.

According to an example embodiment, the catalytic reduction arrangement may be a first catalytic reduction arrangement, wherein the aftertreatment system further comprises a second catalytic reduction arrangement positioned in parallel with the first catalytic reduction arrangement. Hereby, parallel systems are provided which improves the reduction process.

According to an example embodiment, the aftertreatment system may further comprise an outlet positioned downstream the second catalytic device of the first and second catalytic reduction arrangements, said outlet being common for the first and second catalytic reduction arrangements. Hereby, a single outlet is provided for both of the first and second catalytic arrangements.

According to an example embodiment, the aftertreatment system may further comprise a muffler arrangement, wherein the catalytic reduction arrangement is positioned inside the muffler arrangement.

According to a second aspect, there is provided a method for controlling an aftertreatment system connected downstream an internal combustion engine arrangement for receiving exhaust gases conveyed from the internal combustion engine arrangement during operation thereof, the aftertreatment system comprising a catalytic reduction arrangement comprising a first catalytic device and a second catalytic device, wherein the first and second catalytic devices are arranged in series with each other, wherein a geometric gap is present between an outlet of the first catalytic device and an inlet of the second catalytic device, the method being characterized by determining a flow velocity of the exhaust gases conveyed from the internal combustion engine arrangement; comparing the flow velocity with a predetermined threshold value; and controlling the exhaust gases to by-pass the first catalytic device and enter an inlet of the second catalytic device at the geometric gap between the first and second catalytic devices if the flow velocity is lower than the predetermined threshold value.

Effects and features of the second aspect are largely analogous to those described above in relation to the first aspect.

According to a third aspect, there is provided a vehicle comprising an internal combustion engine arrangement and an aftertreatment system according to any one of the embodiments described above in relation to the first aspect. The aftertreatment system is arranged in downstream fluid communication with the internal combustion engine arrangement for receiving exhaust gases conveyed from the internal combustion engine arrangement.

According to a fourth aspect, there is provided a computer program comprising program code means for performing the steps of the second aspect when the program is run on a computer.

According to a fifth aspect, there is provided a computer readable medium carrying a computer program comprising program means for performing the steps of the second aspect when the program means is run on a computer.

Effects and features of the third, fourth and fifth aspects are largely analogous to those described above in relation to the first aspect.

Further features of, and advantages with, the present disclosure will become apparent when studying the appended claims and the following description. The skilled person will realize that different features of the present disclosure may be combined to create embodiments other than those described in the following, without departing from the scope of the present disclosure.

BRIEF DESCRIPTION OF THE DRAWINGS

The above, as well as additional objects, features and advantages of the present disclosure, will be better understood through the following illustrative and non-limiting detailed description of exemplary embodiments of the present disclosure, wherein:

FIG. 5 is a flow chart of a method for controlling an aftertreatment system according to an example embodiment.

DETAILED DESCRIPTION

Figure 1:
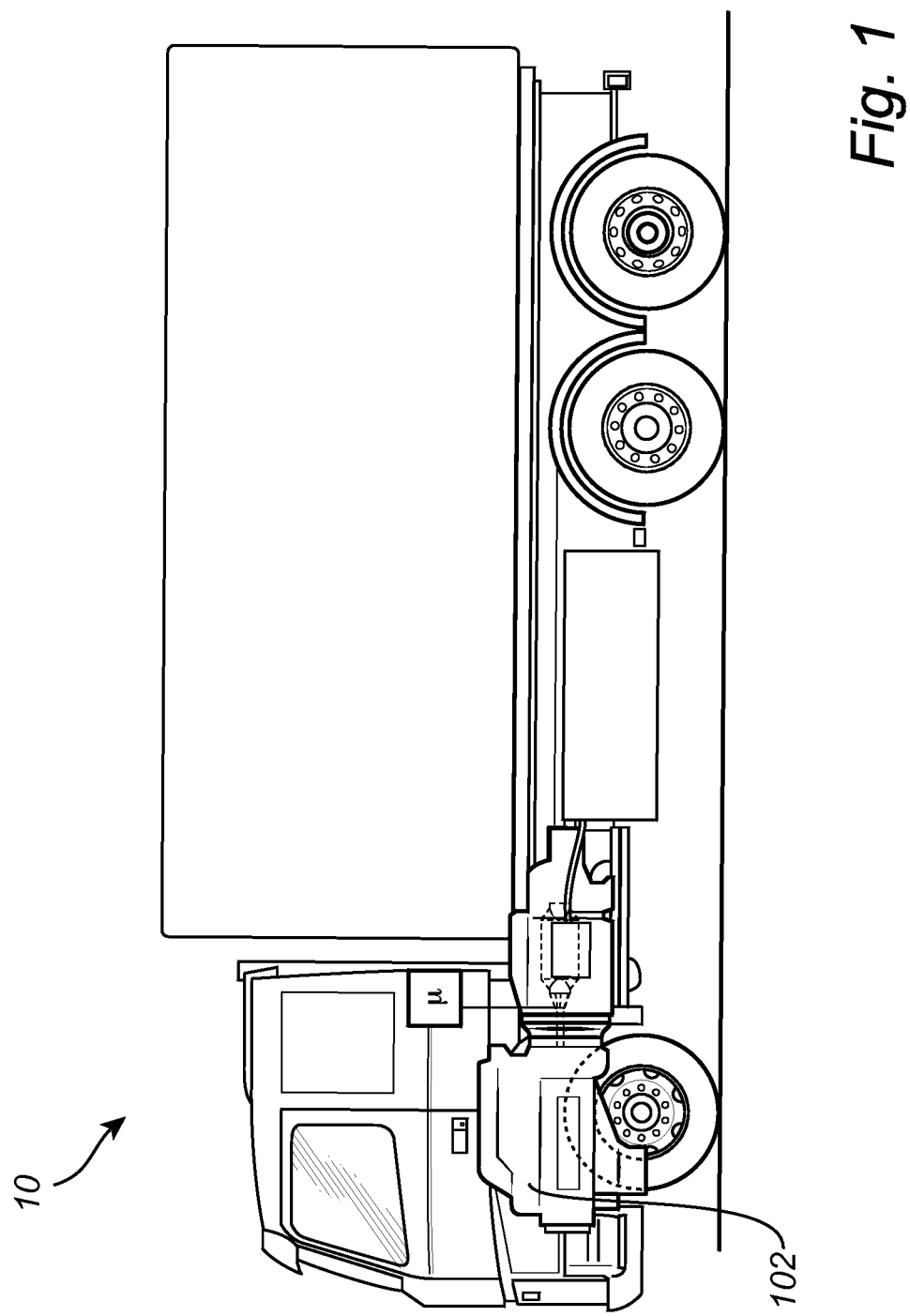
FIG. 1 is a lateral side view illustrating an example embodiment of a vehicle in the form of a truck.

The present disclosure will now be described more fully hereinafter with reference to the accompanying drawings, in which exemplary embodiments are shown. The disclosure may, however, be embodied in many different forms and should not be construed as limited to the embodiments set forth herein; rather, these embodiments are provided for thoroughness and completeness. Like reference character refer to like elements throughout the description.

With particular reference to FIG. 1, there is provided a vehicle 10 in the form of a truck. The vehicle 10 comprises a prime mover 102 in the form of an internal combustion engine arrangement 102. The internal combustion engine arrangement 102 may preferably be fueled by e.g. a conventional fuel such as diesel, although other alternatives are conceivable. The internal combustion engine 102 is preferably a piston-cylinder arrangement operated in a four stroke fashion, i.e. operated by an intake stroke, a compression stroke, a combustion stroke, and an exhaust stroke.

Figure 2:
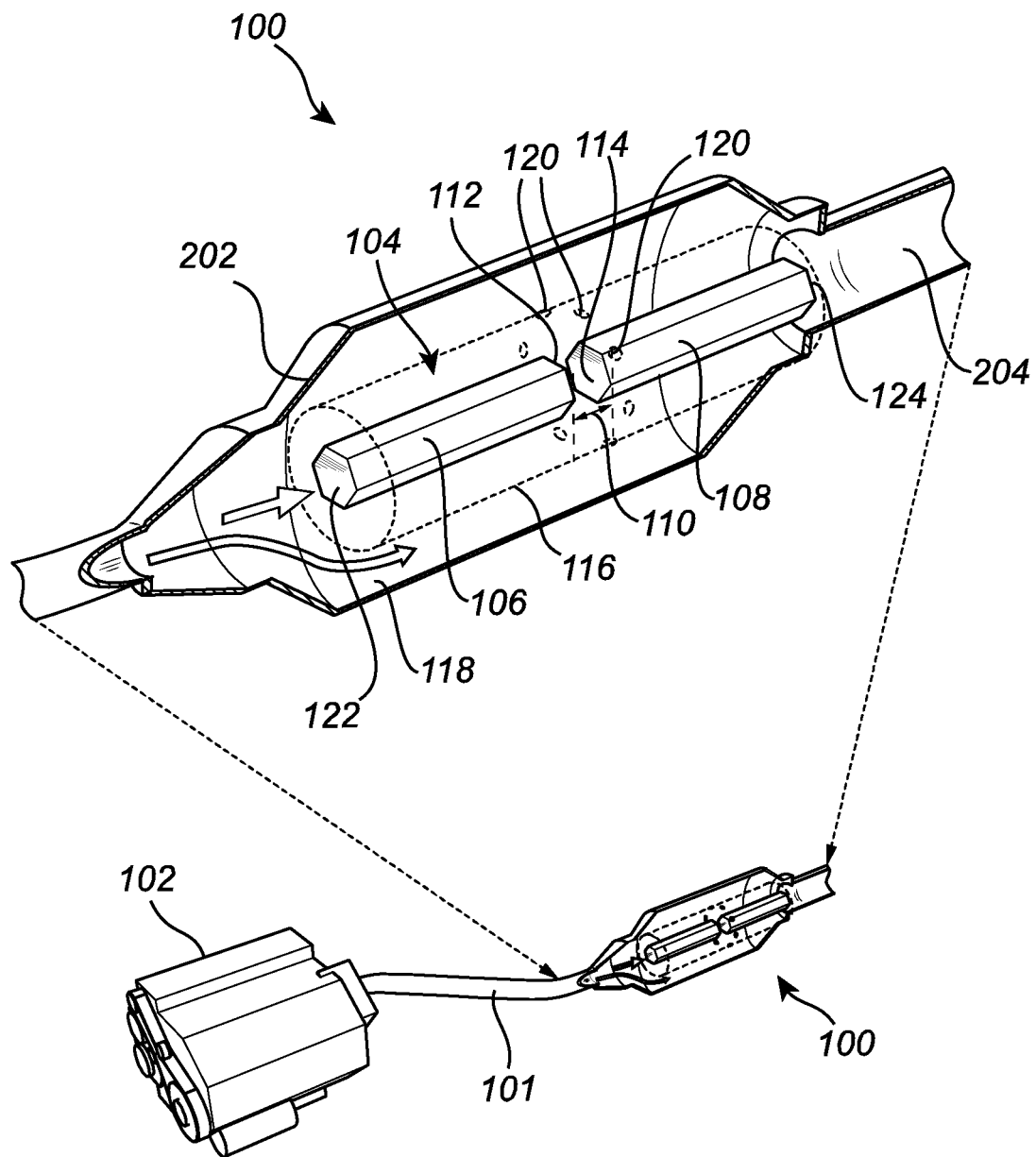
FIG. 2 is a schematic view of an aftertreatment system according to an example embodiment.

Reference is made to FIG. 2, which schematically illustrates an aftertreatment system 100 connected to the internal combustion engine arrangement 102 by means of an exhaust pipe 101. Hence, aftertreatment system 100 receives exhaust gases conveyed from the internal combustion engine arrangement 102 during operation thereof. The aftertreatment system 100 comprises a catalytic reduction arrangement 104 which is arranged to e.g. convert NOx to N2. It should be readily understood that aftertreatment system 100 may comprise further components not included in the illustration of FIG. 2, which components may be arranged in fluid communication between the internal combustion engine arrangement 102 and the catalytic reduction arrangement 104. For example, a particle filter, an oxidation catalyst, a particle trap, a reducing agent injector, etc. may be arranged in fluid communication between the internal combustion engine arrangement 102 and the catalytic reduction arrangement 104.

As can be seen in the enlarged illustration of FIG. 2, the catalytic reduction arrangement 104 comprises a first catalytic device 106 and a second catalytic device 108. The first and second catalytic devices are preferably a first selective catalytic reduction device 106 and a second selective catalytic reduction device 108, which may be configured as substrates carrying catalytic material, commonly referred to as "stones" or "bricks" in the industry. In the following the first catalytic device 106 will be referred to as the first SCR 106, and the second catalytic device 108 will be referred to as the second SCR 108.

The first 106 and second 108 SCR's are arranged in series with each other in the flow direction, whereby the first SCR 106 is positioned closer to the internal combustion engine 102 in comparison to the second SCR 108. Hence, exhaust gas from the internal combustion engine 102 arrives firstly at the first SCR 106. As can be seen in FIG. 2, the first 106 and second 108 SCR's are arranged in such a configuration that a geometric gap 110 is present between an outlet 112 of the first SCR 106 and an inlet 114 of the second SCR 108.

Moreover, the aftertreatment system 100 further comprises a casing 116. As can be seen, the first SCR 106 and the second SCR 108 are positioned within the casing 116 which, in the exemplified embodiment, extends between an inlet end 122 of the first SCR 106 and an outlet end 124 of the second SCR 108. The casing 116 is in the figures schematically illustrated and may equally as well be arranged in close proximity with the first 106 and second 108 SCR. Hence, there may be substantially no gap in the radial direction between the casing 116 and each of the first and second SCR's.

Furthermore, the casing 116 comprises a plurality of through holes 120. As seen in FIG. 2 the through holes 120 are arranged as a plurality of radially extending through holes. In particular, the plurality of through holes 120 is positioned in the circumference of the casing 116 at the position of the geometric gap 110. Hereby, and as will be described further below, exhaust gas conveyed from the internal combustion engine arrangement 102 is allowed to enter the geometric gap 110 through the plurality of through holes 120.

Still further, the casing 116 is in turn positioned within a housing 202, which can be arranged to form part of a muffler arrangement of the vehicle. As further depicted, the aftertreatment system comprises a by-pass duct 118 which is positioned radially outside the casing 116. The by-pass duct 118 is thus formed by the space between the housing 202 and the casing 116.

During operation of the internal combustion engine arrangement 102, exhaust gas is directed towards the inlet end 122 of the first SCR 106. Since there is a difference in pressure drop through the first SCR 106 compared to the pressure drop in the by-pass conduit 118 between the inlet end 122 of the first SCR 106 and the plurality of through holes 120, the exhaust gas will either enter the first SCR 106 or by-pass the first SCR 106. During normal operation of the internal combustion engine arrangement 102, when the flow velocity of the exhaust gas is relatively high, i.e. above a predetermined threshold value, the exhaust gas will enter the first SCR 106 at the inlet end 122, and conveyed through the first SCR 106. Thereafter, the exhaust gas will enter the geometric gap 110 and be further directed into, and through, the second SCR 108 before exiting an outlet 204 of the aftertreatment system 100.

However, during low load operation of the internal combustion engine arrangement 102, such as e.g. during idle, when the flow velocity of the exhaust gas is low, i.e. below the predetermined threshold value and the temperature is lower, the exhaust gas will not enter the first SCR 106. On the contrary, as the pressure drop in the by-pass conduit 118 is lower in comparison to the pressure drop through the first SCR 106, the exhaust gas will enter the by-pass-conduit 118. The exhaust gas during low load operation will enter the geometric gap 110 through the plurality of through holes 120 and be further directed into the second SCR 108. Substantially no flow of exhaust gas, or at least a lower amount of exhaust gas will be directed through the first SCR, which exhaust gas would otherwise cool down the first SCR 106. Hence, the temperature level of the first SCR 106 during e.g. idle can be maintained.

Figure 3:
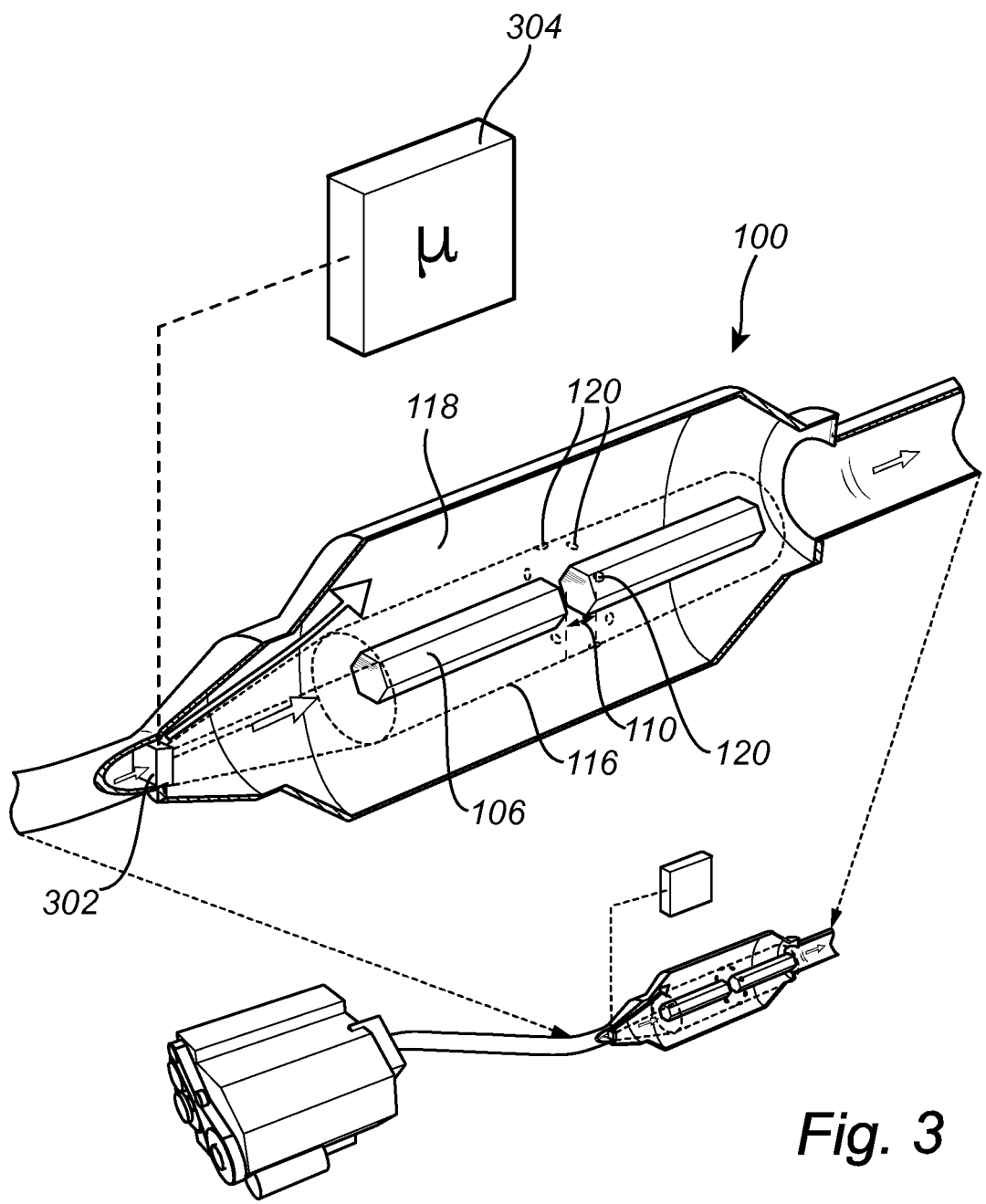
FIG. 3 is a schematic view of an aftertreatment system according to another example embodiment.

The embodiment depicted in FIG. 2 is thus based on the insight that a difference in pressure drop and flow velocity of the exhaust gas will guide the exhaust gas through the first SCR 106, or by-passing the first SCR 106. Another approach is to use a valve arrangement for controlling the flow direction of the exhaust gas. Reference is therefore made to FIG. 3 which illustrates the use of a valve arrangement according to an example embodiment. Features of FIG. 3 already described above in relation to FIG. 2 will not be described in further detail unless explicitly indicated.

As can be seen in FIG. 3, the aftertreatment system 100 comprises a valve arrangement 302 for directing the exhaust gas into the first SCR 106 or into the geometric gap 110 through the plurality of through holes 120 in the casing 116. The valve arrangement 302 is thus positioned upstream the first SCR 108, in fluid communication between the internal combustion engine arrangement and the catalytic reduction arrangement.

According to the embodiment depicted in FIG. 3, the valve arrangement 302 may preferably be an electronically controlled valve arrangement which is connected to a control unit 304 which controls operation thereof. The control unit may in turn be connected e.g. a sensor or the like (not shown) for receiving an input signal for determining the desired flow direction of the exhaust gas. Such sensor may, for example, be a sensor configured to determine the flow velocity of the exhaust gas, or the gas pressure level of the exhaust gas, etc. Hence, the control unit 304 should thus preferably receive a signal indicative of the flow velocity of the exhaust gases conveyed from the internal combustion engine arrangement. If the flow velocity is below the predetermined threshold value, the control unit should control the valve arrangement 302 to direct the exhaust gas through the by-pass duct. Otherwise, i.e. if the flow velocity is above the threshold level, the control unit should direct the exhaust gas into the first SCR 106.

It should however be readily understood that the valve arrangement in FIG. 3 may equally as well be replaced by a mechanically controlled valve (not shown). Such mechanically controlled valve may comprise means, such as e.g. a resilient member in the form of a spring that direct controls the valve arrangement to direct the exhaust gas to either the by-pass duct or into the first SCR 106 based on the flow velocity.

Figure 4:
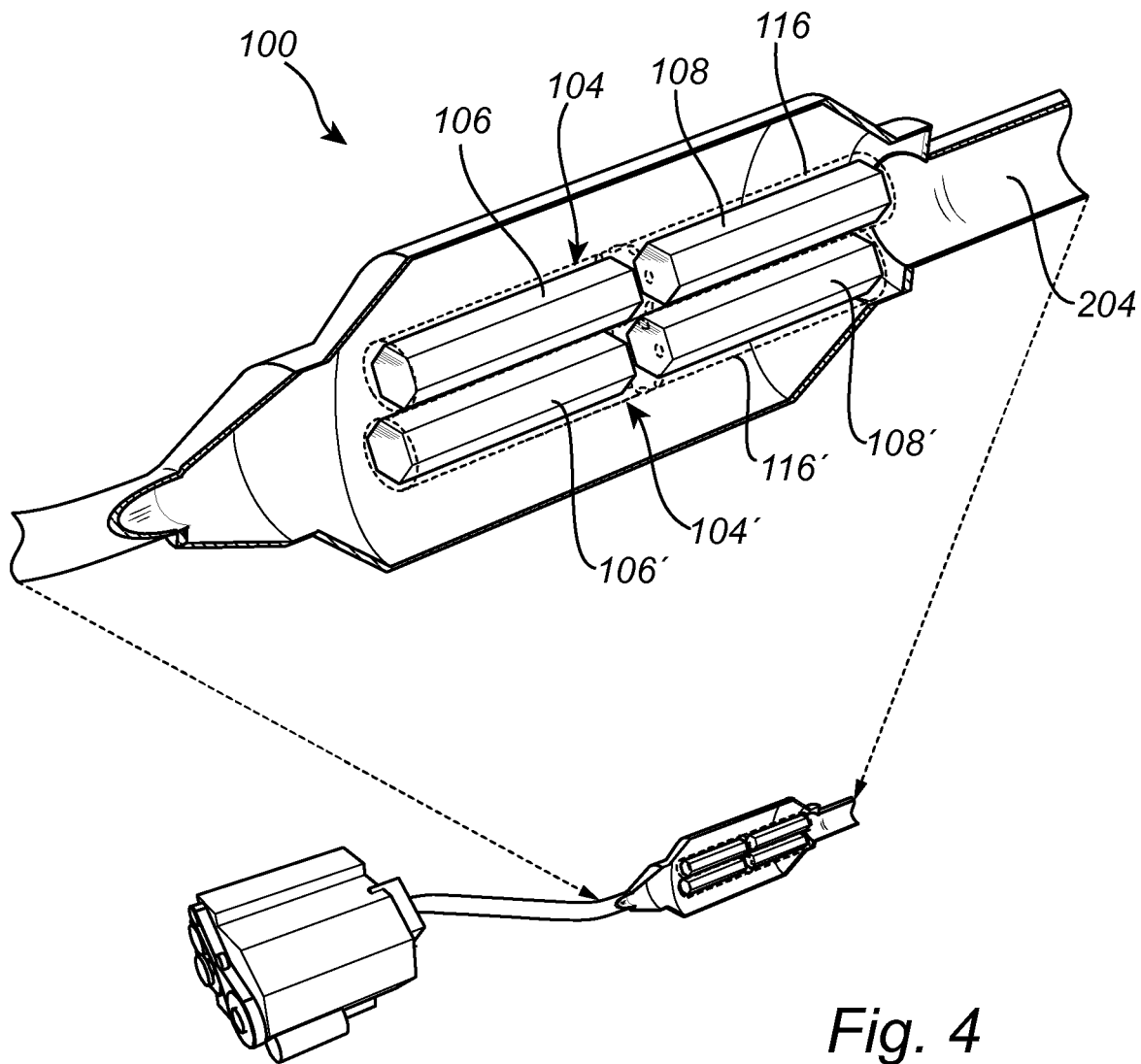
FIG. 4 is a schematic view of an aftertreatment system according to another example embodiment.

In order to describe a still further embodiment of the present disclosure, reference is made to FIG. 4. In FIG. 4, the aftertreatment system 100 comprises catalytic reduction arrangements which are positioned in parallel with each other. Hence, the embodiment depicts a first catalytic reduction arrangement 104 and a second catalytic reduction arrangement 104'. The catalytic reduction arrangements can each be arranged in the same way as the catalytic reduction arrangement described above in relation to FIGS. 2-3. The first 104 and second 104' catalytic reduction arrangements are thus each enclosed by a respective casing 116, 116' comprising a plurality of through holes. In the embodiment of FIG. 4, the outlet 204 of the aftertreatment system 100 is common for the first and second catalytic reduction arrangements. Hence, the first and second catalytic reduction arrangements share the same outlet.

In order to sum up, reference is now made to FIG. 5 illustrating an example embodiment of a flow chart for controlling any of the above described aftertreatment systems. Firstly, the flow velocity of the exhaust gas conveyed from the internal combustion engine arrangement 102 is determined 51. The flow velocity is compared S2 with a predetermined threshold value. The threshold value is preferably set to distinct between normal operation and low load operation of the internal combustion engine arrangement. Low load may include e.g. idling operation of the internal combustion engine arrangement.

If the flow velocity is below the predetermined threshold value, the exhaust gas conveyed from the internal combustion engine arrangement 102 is controlled S3 to by-pass the first SCR 106. Hereby, the exhaust gas is directed into the by-pass conduit 118 and into the geometric gap through the plurality of through holes 120. The exhaust gas is thereafter directed through the second SCR 108 before exiting the aftertreatment system 100 though the outlet 204.

If, on the other hand, the flow velocity is higher than the predetermined threshold value, the exhaust gas conveyed from the internal combustion engine arrangement 102 is controlled S4 to enter the inlet of the first SCR 106. The exhaust gas is thus directed through the first SCR 106, the geometric gap 110, and through the second SCR 108 before exiting the aftertreatment system 100 though the outlet 204.

It is to be understood that the present disclosure is not limited to the embodiments described above and illustrated in the drawings; rather, the skilled person will recognize that many changes and modifications may be made within the scope of the appended claims.

The invention claimed is:

1. An aftertreatment system connectable downstream of an internal combustion engine arrangement for receiving exhaust gases conveyed from the internal combustion engine arrangement during operation thereof, the aftertreatment system comprising:
   a catalytic reduction arrangement comprising a first selective catalytic reduction device arranged to convert nitrogen oxides into diatomic nitrogen and a second selective catalytic reduction device arranged to convert nitrogen oxides into diatomic nitrogen wherein a geometric gap is present between an outlet of the first selective catalytic reduction device and an inlet of the second selective catalytic reduction device, a casing housing the catalytic reduction arrangement, wherein the first selective catalytic reduction device and the second selective catalytic reduction device are arranged within the casing, the casing being positioned within a housing;

a by-pass duct arranged in a space formed between the casing and the housing for allowing exhaust gases to by-pass the first selective catalytic reduction device, wherein the casing comprises a plurality of through holes arranged at the position of the geometric gap for allowing exhaust gases by-passing the first selective catalytic reduction device to enter the inlet of the second selective catalytic reduction device, wherein the first and second catalytic devices are arranged in series with each other in the flow direction of the exhaust gas such that the flow of exhaust gas from the first catalytic device will enter the geometric gap and be further directed into, and through, the second catalytic device.

2. The aftertreatment system according to claim 1, wherein the casing extends between an inlet end of the first selective catalytic reduction device and an outlet end of the second selective catalytic reduction device.

3. The aftertreatment system according to claim 1, further comprising a valve arrangement positioned in fluid communication between the internal combustion engine arrangement and the catalytic reduction arrangement, the valve being arranged to controllably direct exhaust gases from the internal combustion engine arrangement to the inlet of the first selective catalytic reduction device or to the by-pass duct.

4. The aftertreatment system according to claim 3, wherein the valve arrangement comprises an electronically controlled valve, wherein the aftertreatment system further comprises a control unit electrically connected to the electronically controlled valve for controlling operation thereof.

5. The aftertreatment system according to claim 4, wherein the control unit is configured to: receive a signal indicative of a flow velocity of the exhaust gases conveyed from the internal combustion engine arrangement; compare the flow velocity with a predetermined threshold value; and control the electronically controlled valve to direct the exhaust gas to the by-pass duct if the flow velocity is lower than the predetermined threshold.

6. The aftertreatment system according to claim 3, wherein the valve arrangement comprises a mechanically controlled valve.

7. The aftertreatment system according to claim 1, further comprising a housing containing the catalytic reduction arrangement, the by-pass duct being formed by a space between the housing and the casing.

8. The aftertreatment system according to claim 1, wherein the catalytic reduction arrangement is a first catalytic reduction arrangement, wherein the aftertreatment system further comprises a second catalytic reduction arrangement positioned in parallel with the first catalytic reduction arrangement.

9. The aftertreatment system according to claim 8, further comprising an outlet positioned downstream the second selective catalytic reduction device of the first and second catalytic reduction arrangements, the outlet being common for the first and second catalytic reduction arrangements.

10. A vehicle comprising an internal combustion engine arrangement and an aftertreatment system according to claim 1, wherein the aftertreatment system is arranged in downstream fluid communication with the internal combustion engine arrangement for receiving exhaust gases conveyed from the internal combustion engine arrangement.

* * * * *